(12) United States Patent
Yasuda

(10) Patent No.: US 7,224,091 B2
(45) Date of Patent: May 29, 2007

(54) MOTOR

(75) Inventor: Hiromu Yasuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 11/215,231

(22) Filed: Aug. 30, 2005

(65) Prior Publication Data

US 2006/0043800 A1 Mar. 2, 2006

(30) Foreign Application Priority Data

Sep. 1, 2004 (JP) .............................. 2004-254454

(51) Int. Cl.
H02K 37/00 (2006.01)
H02K 37/12 (2006.01)
H02K 37/14 (2006.01)

(52) U.S. Cl. .................................. 310/49 R; 310/181

(58) Field of Classification Search .............. 310/49 R, 310/181
See application file for complete search history.

(56) References Cited

U.S. PATENT DOCUMENTS 4,206,374 A * 6/1980 Goddijn .................... 310/49 R
4,306,164 A * 12/1981 Itoh et al. ................. 310/49 R
4,899,072 A * 2/1990 Ohta ........................ 310/49 R
5,831,356 A 11/1998 Aoshima

FOREIGN PATENT DOCUMENTS

JP 09-331666 12/1997
JP 2002-51526 2/2002

* cited by examiner

Primary Examiner—David Bruce
Assistant Examiner—Hong-Vinh Nguyen

(57) ABSTRACT

A stepping motor includes a hollow cylindrical fixed yoke; a magnet disposed coaxially with the fixed yoke and divided into sections in the circumferential direction, the sections being alternately magnetized; a first coil and a second coil coaxially fixed to the fixed yoke; a first rotational yoke facing a magnetized surface of the magnet and excited by the first coil; a second rotational yoke facing the magnetized surface of the magnet and excited by the second coil; and bearing units formed in bobbins for supporting a rotor including the first rotational yoke, a connecting member, and the second rotational yoke such that the rotor is rotatable with respect to the fixed yoke.

7 Claims, 12 Drawing Sheets

MOTOR

BACKGROUND OF THE INVENTION

1. Field of the Invention

The present invention relates to hollow cylindrical motors.

2. Description of the Related Art

Up to now, some stepping motors having small diameters with respect to rotation axes and having increased outputs have been proposed (See Japanese Patent Laid-Open No. 09-331666 (U.S. Pat. No. 5,831,356)). FIG. 9 is an exploded perspective view illustrating component parts of a known stepping motor. FIG. 10 is a cross-sectional view illustrating the structure of the stepping motor after assembly. The stepping motor includes a rotor 201, a first coil 202, a second coil 203, a first stator 204, a second stator 205, an output shaft 206, and a connecting ring 207.

The rotor 201 is a permanent magnet divided into four sections in the circumferential direction that are alternately polarized. The first and second coils 202 and 203 are disposed adjacent to the respective ends of the rotor 201 in the axial direction. The first and second stators 204 and 205 are composed of a soft magnetic material, and are excited by the first and second coils 202 and 203, respectively.

The first stator 204 includes first outer magnetic poles 204A and 204B facing the outer periphery of the rotor 201 with a spacing therebetween, and first inner magnetic poles 204C and 204D facing the inner periphery of the rotor 201 with a spacing therebetween. The second stator 205 includes second outer magnetic poles 205A and 205B facing the outer periphery of the rotor 201 with a spacing therebetween, and second inner magnetic poles 205C and 205D facing the inner periphery of the rotor 201 with a spacing therebetween.

The output shaft 206 is fixed to the rotor 201, and supported by a bearing unit 204E of the first stator 204 and a bearing unit 205E of the second stator 205 so as to be rotatable. The connecting ring 207 is composed of a non-magnetic material, and retains the first and second stators 204 and 205 with a predetermined spacing therebetween.

In the stepping motor having the above-described structure, the rotor 201 is rotated by switching the current-carrying direction to the first coil 202 and the second coil 203 so as to switch the polarities of the first outer magnetic poles 204A and 204B, the first inner magnetic poles 204C and 204D, the second outer magnetic poles 205A and 205B, and the second inner magnetic poles 205C and 205D.

In this stepping motor, magnetic flux generated by energizing the coils flows from the outer magnetic poles to the opposing inner magnetic poles, or from the inner magnetic poles to the opposing outer magnetic poles so as to efficiently act on the magnet located between the outer magnetic poles and the inner magnetic poles. Moreover, since the distances between the outer magnetic poles and the inner magnetic poles can be reduced to approximately the thickness of the cylindrical magnet (rotor), the resistance of the magnetic circuit including the outer magnetic poles and the inner magnetic poles can be reduced. More magnetic flux can be generated with a small current, and the output can be increased as the resistance of the magnetic circuit is reduced.

The stepping motor of this type disclosed in Japanese Patent Laid-Open No. 09-331666 (U.S. Pat. No. 5,831,356) is cylindrical. When such a stepping motor for driving diaphragm blades, a shutter, a lens, and the like is disposed in a barrel of a camera so as to be parallel to the optical axis, the radius of the barrel is the sum of the radius of the lens, the radius of the aperture, and the diameter of the motor. Therefore, the diameter of the barrel of the camera cannot be sufficiently reduced. FIG. 11 illustrates the layout of a light-amount adjusting device, an aperture, and a motor shown in the axial direction. When diameters of a motor M, an aperture 301, and a barrel base plate (light-amount adjusting device) 300 are defined as D1, D2, and D3, respectively, the diameter D3 of the barrel base plate 300 is at least the sum of twice the diameter D1 and the diameter D2. Therefore, toroidal motors having thin thicknesses in the radial direction are demanded for such a use. Furthermore, a reduction in size of the barrel device or the light-amount adjusting device is also demanded.

A stepping motor that resolves the above-described problem is proposed in Japanese Patent Laid-Open No. 2002-51526. FIG. 12 is an exploded perspective view illustrating component parts of another known stepping motor. FIG. 13 is a cross-sectional view illustrating the structure of the stepping motor after assembly. The cross-sectional view is taken at the center of the axis. The stepping motor includes a rotor 401, a first coil 402, a second coil 404, a first stator 418, a second stator 419, and a connecting ring 420.

The rotor 401 is a permanent magnet divided into N sections in the circumferential direction that are alternately polarized. In this case, N equals 16. The first and second coils 402 and 404 are disposed adjacent to the respective ends of the rotor 401 in the axial direction. The first and second stators 418 and 419 are composed of a soft magnetic material, and are excited by the first and second coils 402 and 404, respectively. The connecting ring 420 is composed of a non-magnetic material, and coaxially retains the first and second stators 418 and 419 at a predetermined angle with a predetermined spacing therebetween.

In the stepping motor having the above-described structure, the rotor 401 is fitted into the connecting ring 420, and retained by bearing units 420a and 420i of the connecting ring 420 so as to be rotatable. Output for driving diaphragm blades and a lens barrel is extracted from pins 401t of the rotor 401.

Since the stepping motor is a hollow cylinder, the stepping motor can be disposed in a barrel of a camera so as to be parallel to the optical axis, and diaphragm blades, a shutter, a lens, and the like can be disposed inside the motor. Thus, the diameter of the barrel of the camera can be reduced.

However, in the stepping motor described in Japanese Patent Laid-Open No. 2002-51526, the magnet serving as the rotor is covered with yokes. Thus, the stepping motor needs the pins 401t in order to extract the output. This leads to increases in size, the number of parts, and costs.

Moreover, projections 420t of the connecting ring 420 extend inward in the radial direction from the outer periphery of the rotor 401. Therefore, the projections 420t must be elastically deformed when the rotor 401 is fitted into the connecting ring 420, resulting in poor assembling workability.

Furthermore, the axial-direction distance between the two bearing units 420a and 420i that support the rotor 401 such that the rotor 401 is rotatable cannot be longer than the length of the magnet (rotor) in the axial direction. Therefore, the rotor is easily inclined, and the rotation is not stable.

In addition, gaps in the radial direction are required between the rotor 401 and the stators. This leads to an increase in magnetic resistance and a reduction in space efficiency, and thus high torque cannot be obtained.

SUMMARY OF THE INVENTION

The present invention is directed to a hollow cylindrical stepping motor that can expose a rotor outside the motor. Moreover, the present invention provides a stepping motor with excellent assembling workability. Furthermore, the present invention provides a stepping motor that has bearing units for supporting the rotor, the distance from the outer end of one bearing unit to the outer end of the other bearing unit substantially being equal to the length of the motor in the axial direction, such that the rotation axis of the rotor is not inclined with respect to a stator for smaller loss rotation. In addition, the present invention provides a small yet high-torque stepping motor.

In one aspect of the present invention, a motor includes a hollow cylindrical stator; a magnet disposed coaxially with the stator and divided into sections in a circumferential direction, the sections being alternately magnetized; a first coil and a second coil coaxially fixed to the stator; a rotor including first and second members, wherein the first magnetic pole member faces a magnetized surface of the magnet and is excited by the first coil, and wherein the second magnetic pole member faces the magnetized surface of the magnet and is excited by the second coil. The rotor is rotatable with respect to the stator.

Further features of the present invention will become apparent from the following description of exemplary embodiments with reference to the attached drawings.

DESCRIPTION OF THE EMBODIMENTS

Embodiments of the stepping motor according to the present invention will now be described with reference to the drawings.

First Embodiment (Structure of Stepping Motor)

Figure 1:
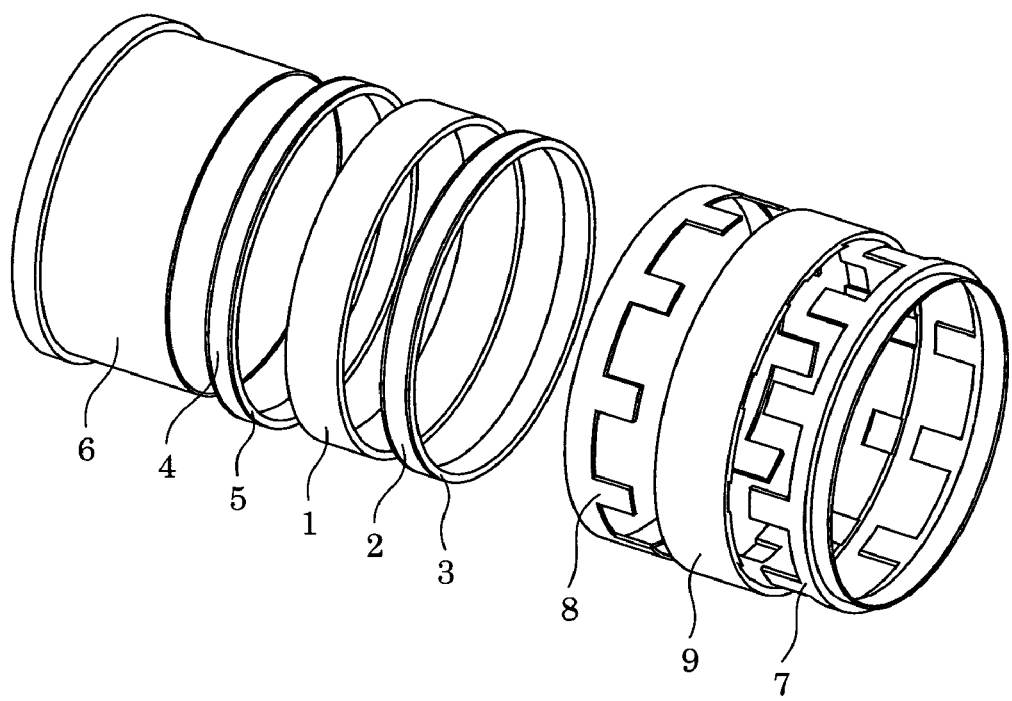
FIG. 1 is an exploded perspective view illustrating component parts of a stepping motor according to a first embodiment of the present invention.
Figure 2:
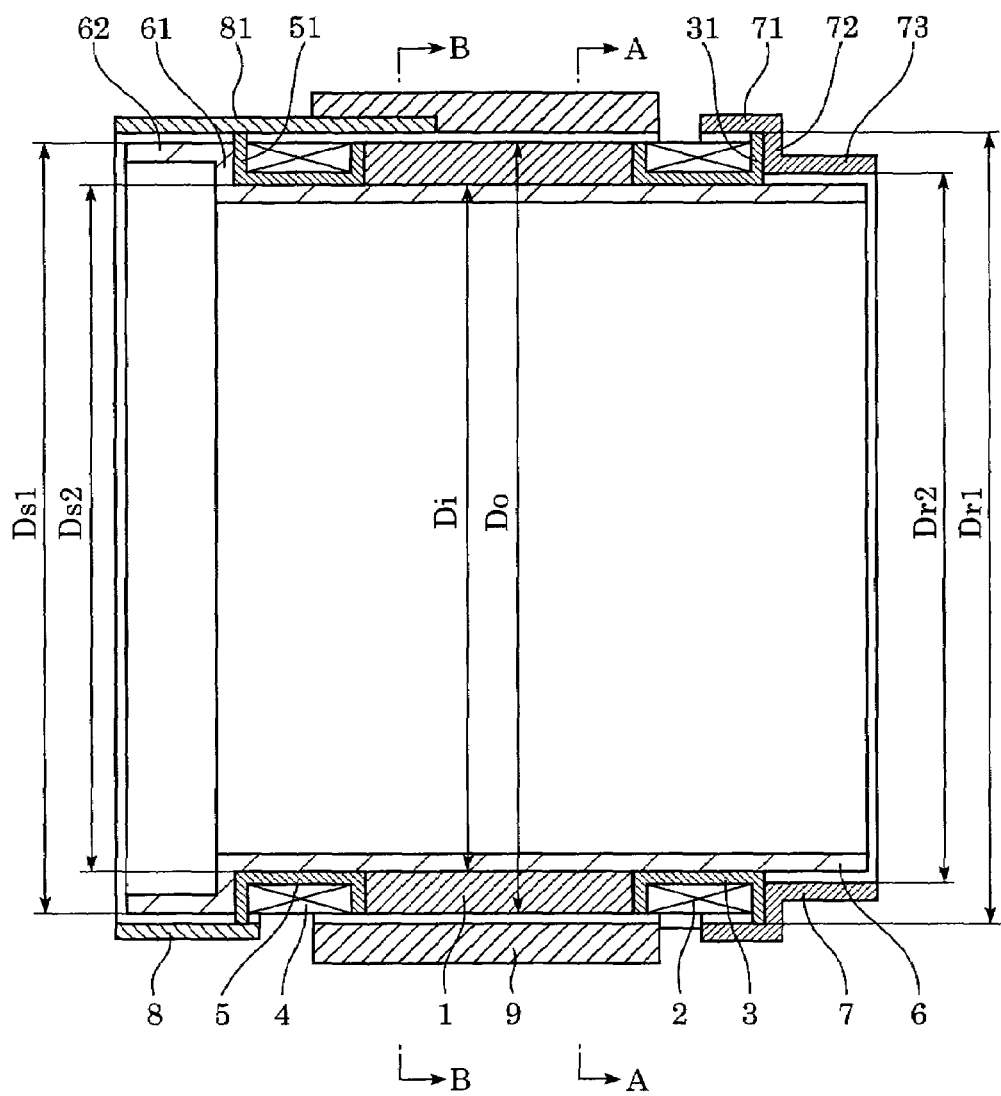
FIG. 2 is a cross-sectional view illustrating the structure of the stepping motor shown in FIG. 1 after assembly.

FIG. 1 is an exploded perspective view illustrating component parts of a stepping motor according to a first embodiment of the present invention. FIG. 2 is a cross-sectional view illustrating the structure of the stepping motor after assembly. The cross-sectional view in FIG. 2 is taken at the center of the axis. The stepping motor according to this embodiment includes a magnet 1, a first coil 2, a second coil 4, a fixed yoke 6, a first rotational yoke 7, a second rotational yoke 8, and a connecting member 9.

The magnet 1 is a hollow cylinder. The surface of the outer periphery (external surface) of the magnet 1 is divided into N sections in the circumferential direction, and the sections are alternately magnetized in S-pole or N-pole. In this embodiment, N equals 20. On the other hand, the internal surface of the magnet 1 may have a magnetized distribution weaker than that of the external surface, may not be magnetized, or may be magnetized in opposite poles with respect to the external surface.

The first coil 2 is cylindrical, and is wound around a first bobbin 3. The first coil 2 is disposed at one end of the magnet 1 in the axial direction coaxially with the magnet 1. The external diameter of the first coil 2 substantially equals that of the magnet 1. The first bobbin 3 includes a bearing unit 31, and the external diameter of this bearing unit 31 is slightly larger than that of the first coil 2.

The second coil 4 is cylindrical, and is wound around a second bobbin 5. As in the case for the first coil 2, the second coil 4 is disposed at the other end of the magnet 1 in the axial direction coaxially with the magnet 1. As a result, the magnet 1 is disposed so as to intervene between the first coil 2 and the second coil 4. The external diameter of the second coil 4 substantially equals that of the magnet 1. The second bobbin 5 includes a bearing unit 51, and the external diameter of this bearing unit 51 is slightly larger than that of the second coil 4.

The fixed yoke 6 is a hollow cylinder composed of a soft magnetic material. The minimum external diameter $Ds2$ of the fixed yoke 6 substantially equals the internal diameter of the magnet 1. One end of the fixed yoke 6 is stepped so as to have a larger diameter, and a top 61 and a flux-transmitting portion 62 are integrated at this end. The maximum external diameter $Ds1$ of the fixed yoke 6 at the flux-transmitting portion 62 is slightly smaller than the external diameters of the bearing units 31 and 51 of the first and second bobbins.

A stator of the stepping motor according to this embodiment is configured by fixing the first coil 2, the first bobbin 3, the magnet 1, the second coil 4, and the second bobbin 5 to the outer periphery of the fixed yoke 6. At this time, the internal diameter $Di$ of the magnet 1, the maximum external diameter $Ds1$ of the fixed yoke 6, the minimum external diameter $Ds2$ of the fixed yoke 6, and the maximum internal diameter $Dr1$ of the first rotational yoke 7 (rotor) have the following relationships:

$$Ds2 \leq Di, Di < Ds1 < Dr1.$$

Since the opening end of the fixed yoke 6 has the minimum external diameter, the magnet 1 is inserted from the side of the opening end of the fixed yoke 6 for an easy assembly.

The first rotational yoke 7 composed of a soft magnetic material includes an external cylinder 71, a toroidal top 72, and a flux-transmitting portion 73. The external cylinder 71 includes first magnetic poles 71-1, 71-2, ..., 71-N/2 at one end thereof (see FIG. 3). These first magnetic poles 71-1, 71-2, ..., 71-N/2 are formed by cutting out parts of the cylinder so as to form a so-called comb shape whose teeth extend along the central axis of the magnet 1 and parallel to the magnetized surface of the magnet 1. The number of teeth of the first magnetic poles is 1 to N/2. In this embodiment, the number is ten. Thus, the first magnetic poles having a predetermined width are disposed at intervals of 720°/N in the circumferential direction. Moreover, the internal diameter of the flux-transmitting portion 73 is slightly smaller than that of the external cylinder 71, and the internal diameter of the external cylinder 71 substantially equals the external diameter of the bearing unit 31 of the first bobbin 3. The flux-transmitting portion 73 is integrated with the external cylinder 71 via the top 72.

The second rotational yoke 8 composed of a soft magnetic material includes an external cylinder 81. The external cylinder 81 of the second rotational yoke includes second magnetic poles 81-1, 81-2, ..., 81-N/2 at one end thereof (see FIG. 3B). These second magnetic poles 81-1, 81-2, ..., 81-N/2 are formed by cutting out parts of the cylinder so as to form a so-called comb shape whose teeth extend along the central axis of the magnet 1 and parallel to the magnetized surface of the magnet 1. The number of teeth of the second magnetic poles is 1 to N/2. In this embodiment, the number is ten. Thus, the second magnetic poles having a predetermined width are disposed at intervals of 720°/N in the circumferential direction.

The connecting member 9 is a hollow cylinder composed of a non-magnetic material. The internal diameter of the connecting member 9 substantially equals that of the second rotational yoke 8. The connecting member 9 includes positioning portions for the first rotational yoke and the second rotational yoke on the inner periphery thereof. The positioning portions for the first rotational yoke are grooves that have substantially the same width of the first magnetic pole 71-1 of the first rotational yoke 7. The number of the positioning portions is the same as that of the first magnetic poles. The positioning portions for the second rotational yoke are grooves that have substantially the same width of the second magnetic pole 81-1 of the second rotational yoke 8. The number of the positioning portions is the same as that of the second magnetic poles.

The rotor of the stepping motor according to this embodiment is configured with the first rotational yoke 7, the connecting member 9, and the second rotational yoke 8. The first rotational yoke 7 and the second rotational yoke 8 are coaxially disposed at predetermined positions and with predetermined phases by fitting the first magnetic poles of the first rotational yoke 7 and the second magnetic poles of the second rotational yoke 8 into the respective positioning portions for the first rotational yoke and the second rotational yoke of the connecting member 9. Since the connecting member 9 is composed of a non-magnetic material, the magnetic circuit between the first rotational yoke 7 and the second rotational yoke 8 is separated, and the magnetic poles do not easily influence on each other. The first rotational yoke 7 and the second rotational yoke 8 correspond to a first magnetic pole member and a second magnetic pole member, respectively, according to the first aspect of the present invention.

The maximum internal diameter $Dr1$ of the rotor corresponds to the internal diameters at the external cylinder 71 and the external cylinder 81, and is slightly larger than the external diameter $Do$ of the magnet 1. The minimum internal diameter $Dr2$ corresponds to the internal diameter at the flux-transmitting portion 73 of the first rotational yoke 7, and satisfies the following relationship:

$$Di<Dr2<Do$$

Where $Di$ is the internal diameter of the magnet 1. With this relationship, the stepping motor can be assembled by fitting the stator (fixed yoke 6) into the rotor. At this time, the stator is inserted from the side of the second rotational yoke of the rotor for an easy assembly. Since the first rotational yoke 7 and the second rotational yoke 8 are supported by the bearing unit 31 of the first bobbin 3 and the bearing unit 51 of the second bobbin 5, respectively, so as to be rotatable, the rotor is rotatable with respect to the stator. At this time, the flux-transmitting portion 62 of the fixed yoke 6 faces the second rotational yoke 8 with a small spacing therebetween in the radial direction. Also, the flux-transmitting portion 73 of the first rotational yoke 7 faces the fixed yoke 6 with a small spacing therebetween in the radial direction.

(Operation of Stepping Motor)

Rotational operations of the stepping motor having the above-described structure will now be described. FIGS. 3A to 6B illustrate polarities and rotational positions of the magnetic poles of the first rotational yoke 7 and the second rotational yoke 8 during the rotation of the stepping motor. FIGS. 3A, 4A, 5A and 6A are cross-sectional views taken along line A-A in FIG. 2. FIGS. 3B, 4B, 5B, and 6B are cross-sectional views taken along line B-B in FIG. 2.

Figure 3B:
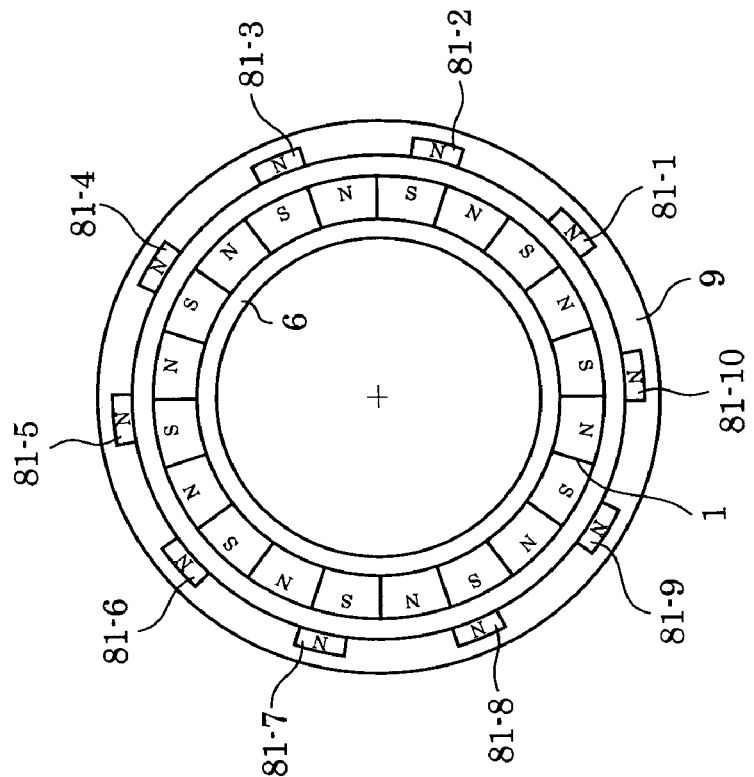
FIGS. 3A and 3B illustrate polarities and rotational positions of magnetic poles of a first rotational yoke and a second rotational yoke during the rotation of the stepping motor.
Figure 3A:
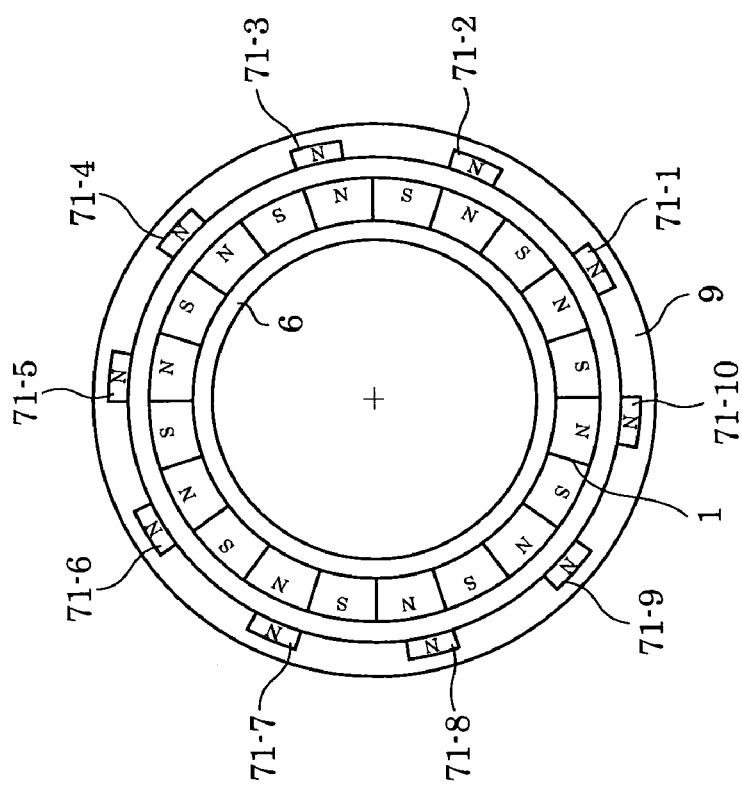

In FIGS. 3A and 3B, the first rotational yoke 7 is magnetized in N-pole by applying a forward current to the first coil 2, and at the same time, the second rotational yoke 8 is magnetized in N-pole by applying a forward current to the second coil 4. At this time, a counterclockwise torque is generated by a magnetic force (repulsive force) between the polarity (N-pole) at the external surface of the magnet 1 adjacent to the stator and the polarity (N-pole) of the magnetized first rotational yoke 7. At the same time, a counterclockwise torque is generated by a magnetic force (attractive force) between S-pole at the external surface of the magnet 1 adjacent to the stator and the second rotational yoke 8 magnetized in N-pole. As a result, the rotor rotates by an angle towards a stable point in this current-carrying state (see FIGS. 4A and 4B).

Figure 4B:
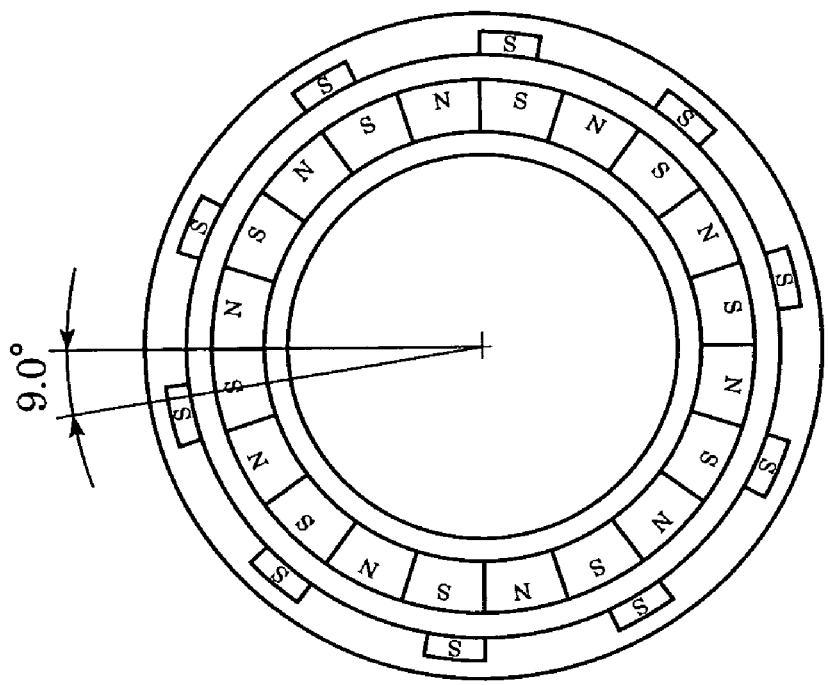
FIGS. 4A and 4B illustrate a state where a rotor is rotated by 180°/N from the state shown in FIGS. 3A and 3B by switching current direction to coils.
Figure 4A:
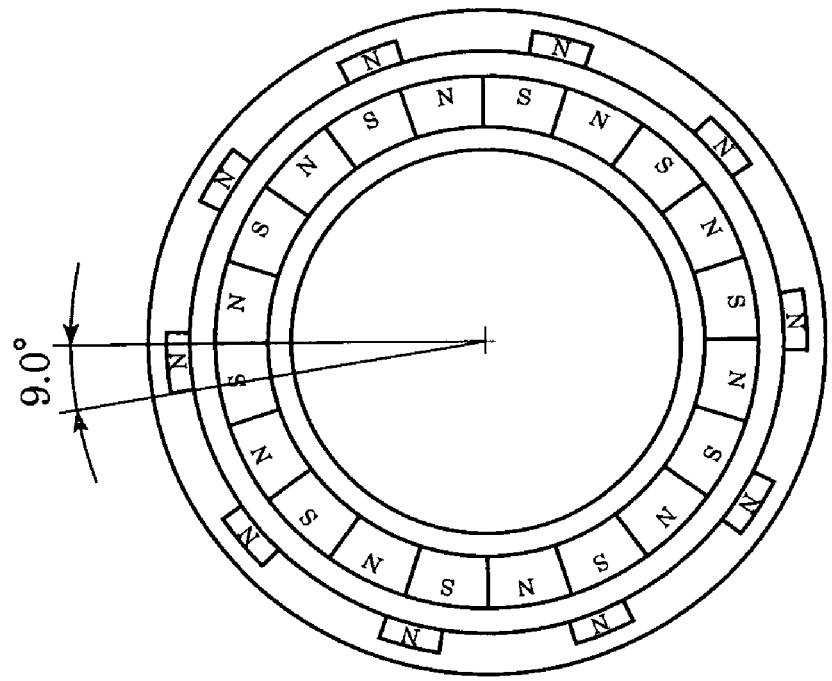

FIGS. 4A and 4B illustrate a state where the rotor is rotated by 180°/N (9.0° in this embodiment) from the state shown in FIGS. 3A and 3B. The first rotational yoke 7 is kept magnetized in N-pole by applying a forward current to the first coil 2, but this time, the second rotational yoke 8 is magnetized in S-pole by applying a reverse current to the second coil 4. As in the case for FIGS. 3A and 3B, a counterclockwise torque is generated by a magnetic force (repulsive force) between the polarity (S-pole) at the external surface of the magnet 1 adjacent to the stator and the polarity (S-pole) of the magnetized second rotational yoke 8, and by a magnetic force (attractive force) simultaneously generated between S-pole at the external surface of the magnet 1 and the first rotational yoke 7 magnetized in N-pole. As a result, the rotor rotates by an angle towards a stable point in this current-carrying state (see FIGS. 5A and 5B).

Figure 5B:
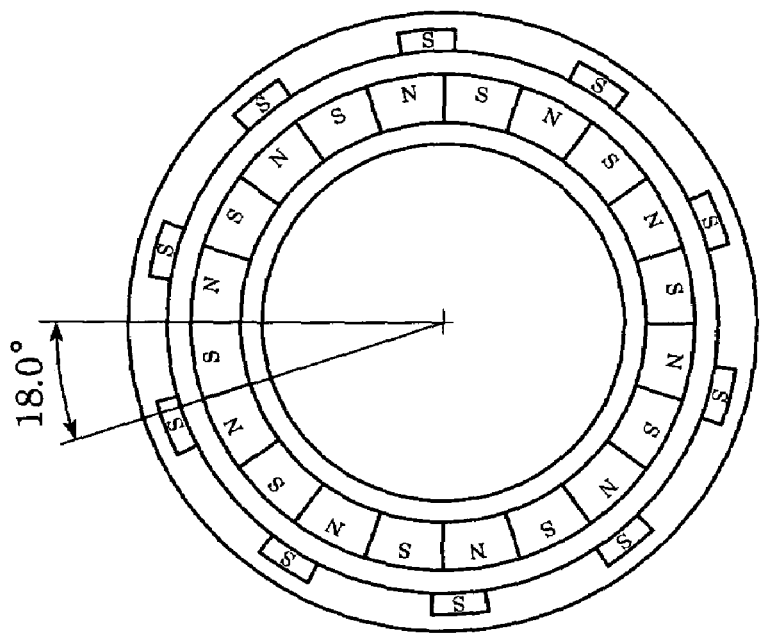
FIGS. 5A and 5B illustrate a state where the rotor is further rotated by 180°/N from the state shown in FIGS. 4A and 4B by switching the current direction to the coils.
Figure 5A:
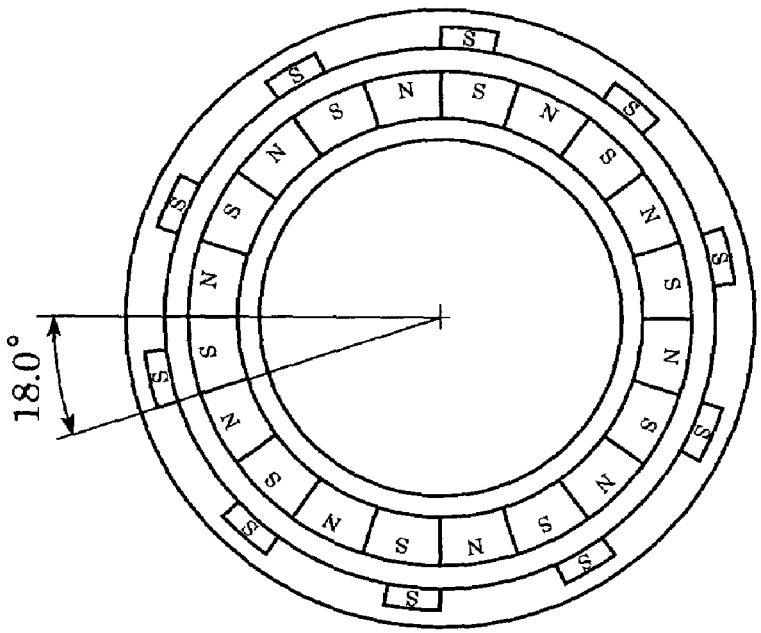

FIGS. 5A and 5B illustrate a state where the rotor is rotated by 2×180°/N (18.0° in this embodiment) from the state shown in FIGS. 3A and 3B. This time, the first rotational yoke 7 is magnetized in S-pole by applying a reverse current to the first coil 2, and the second rotational yoke 8 is kept magnetized in S-pole by applying a reverse current to the second coil 4. As in the case for FIGS. 3A to 4B, a counterclockwise torque is generated by magnetic forces between the polarities at the external surface of the magnet 1 adjacent to the stator and the polarities of the first and second rotational yokes. As a result, the rotor rotates by an angle towards a stable point in this current-carrying state (see FIGS. 6A and 6B).

Figure 6B:
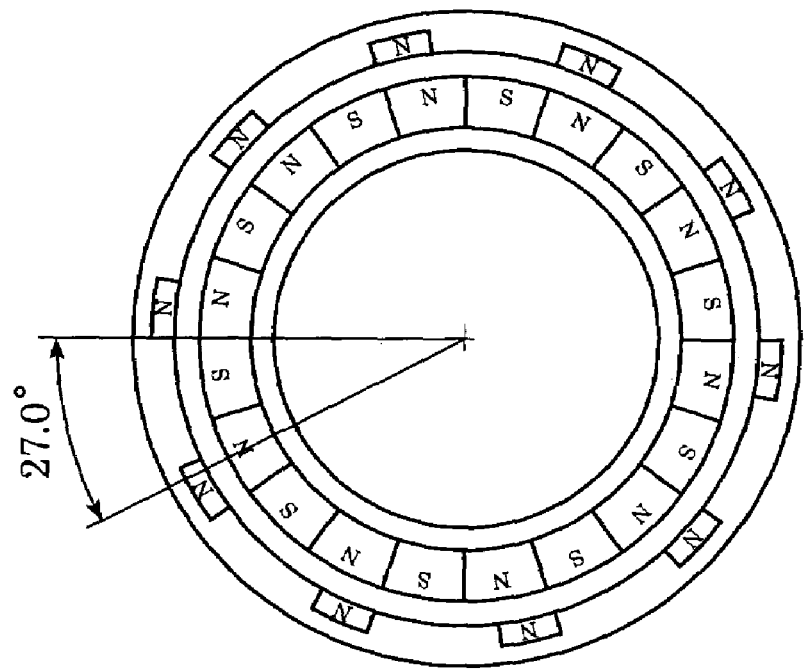
FIGS. 6A and 6B illustrate a state where the rotor is further rotated by 180°/N from the state shown in FIGS. 5A and 5B by switching the current direction to the coils.
Figure 6A:
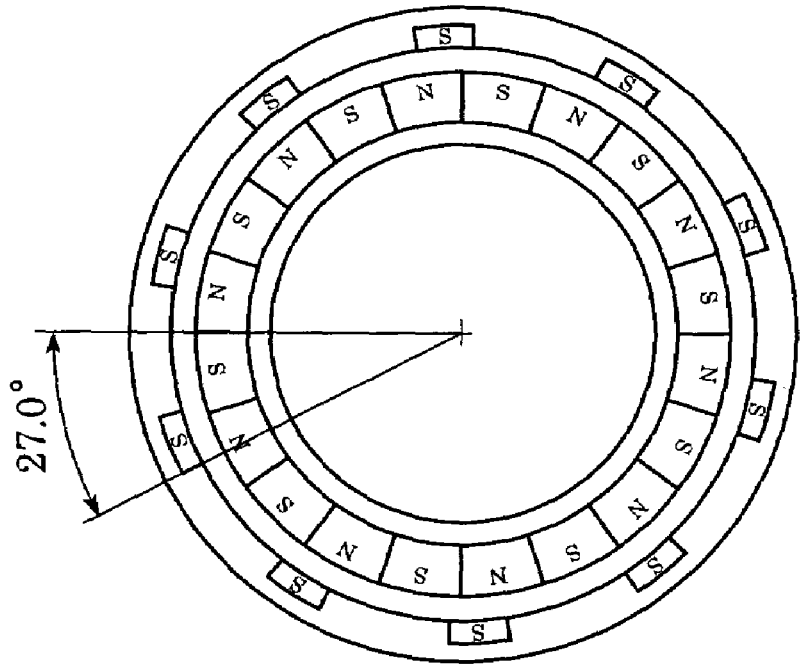

FIGS. 6A and 6B illustrate a state where the rotor is rotated by 3×180°/N (27.0° in this embodiment) from the state shown in FIGS. 3A and 3B. The first rotational yoke 7 is kept magnetized in S-pole by applying a reverse current to the first coil 2, and the second rotational yoke 8 is magnetized in N-pole by applying a forward current to the second coil 4. As in the case for FIGS. 3A to 5B, a counterclockwise torque is generated by magnetic forces between the polarities at the external surface of the magnet 1 adjacent to the stator and the polarities of the first and second rotational yokes. As a result, the rotor rotates by an angle towards a stable point in this current-carrying state (see FIGS. 3A and 3B).

In this manner, the rotor configured with the first rotational yoke 7 and the second rotational yoke 8 sequentially rotates towards positions depending on the phases during energization by sequentially switching the directions of the currents applied to the first coil 2 and the second coil 4. In the above-described embodiment, the external surface of the magnet 1 is divided into magnetized layers in the circumferential direction. The phases of the magnetized layers at two sections in the axial direction, i.e. at a section facing the first rotational yoke 7 and at the other section facing the second rotational yoke 8, are identical. In addition, the phases of the first rotational yoke and the second rotational yoke are shifted by 180°/N with respect to each other. However, the present invention is not limited to those described above, and the phases of the magnetized layers at the section facing the first rotational yoke 7 and the magnetized layers at the other section facing the second rotational yoke 8 may be shifted by 180°/N with respect to each other, and the phases of the first rotational yoke and the second rotational yoke may be identical.

According to the stepping motor of this embodiment, the rotor can be disposed at the outermost layer of the motor so as to form a hollow cylinder, and thus the output can easily be extracted. Moreover, the distance from the outer end of one bearing unit to the outer end of the other bearing unit that support the rotor can be equal to the length of the motor in the axial direction. Therefore, the rotation axis of the rotor is not easily inclined with respect to the stator, resulting in rotation with a smaller loss. Furthermore, since a gap between the external surface of the fixed yoke and the internal surface of the magnet is not necessary, distances between outer magnetic poles and inner magnetic poles can be reduced. As a result, the magnetic resistance can be reduced, and the output from the motor can be increased. In addition, the fixed yoke includes the flux-transmitting portion at one end face thereof, and the first rotational yoke also includes the flux-transmitting portion. Accordingly, the motor can be produced by fitting the rotor onto the stator after assembling the rotor and the stator separately. Thus, the motor with excellent assembling workability can be realized.

(Feature of Stepping Motor)

Distinctive structures and the effects of the stepping motor according to this embodiment will now be described. In this embodiment, a hollow stepping motor can be produced, and the interior of the motor can be used for optical paths, liquid conduits, electric wiring, and the like. This advantageously leads to a reduction in size of the whole device.

The first magnetic poles of the first rotational yoke 7 face the external surface of the magnet 1 with a predetermined spacing therebetween, and the second magnetic poles of the second rotational yoke 8 also face the external surface of the magnet 1 with a predetermined spacing therebetween. The first rotational yoke 7 is excited by the first coil 2, and the second rotational yoke 8 is excited by the second coil 4. The fixed yoke 6 is disposed at a position so as to face the magnetic poles of the first rotational yoke 7 and the second rotational yoke 8 with the magnet 1 interposed therebetween. Portions of the fixed yoke 6 facing the first rotational yoke 7 with the magnet 1 interposed therebetween function as first inner magnetic poles magnetized in a polarity opposite to that of the magnetic poles of the first rotational yoke 7. Similarly, portions of the fixed yoke 6 facing the second rotational yoke 8 with the magnet 1 interposed therebetween function as second inner magnetic poles magnetized in a polarity opposite to that of the magnetic poles of the second rotational yoke 8.

The magnetic flux generated by the first coil 2 passes between the first magnetic poles of the first rotational yoke 7 facing the external surface of the magnet 1 and the first inner magnetic poles of the fixed yoke 6 fixed to the inner surface of the magnet 1 so as to effectively act on the magnet 1. In this case, a gap between the external surface of the fixed yoke 6 and the internal surface of the magnet 1 is not necessary.

Similarly, the magnetic flux generated by the second coil 4 passes between the second magnetic poles of the second rotational yoke 8 facing the external surface of the magnet 1 and the second inner magnetic poles of the fixed yoke 6 fixed to the inner surface of the magnet 1 so as to effectively act on the magnet 1. In this case, a gap between the external surface of the fixed yoke 6 and the internal surface of the magnet 1 is not necessary. As described above, since the distances between the outer magnetic poles and the inner magnetic poles can be reduced, the magnetic resistance can be reduced, and the torque output can be increased compared with the known technology described in Japanese Patent Laid-Open No. 2002-51526.

The fixed yoke 6 includes the flux-transmitting portion 62 at one end face thereof, and the first rotational yoke 7 also includes the flux-transmitting portion 73. In this case, the external diameter Do of the magnet 1, the internal diameter Di of the magnet 1, the maximum internal diameter Dr1 of the rotor, the minimum internal diameter Dr2 of the rotor, the maximum external diameter Ds1 of the stator, and the minimum external diameter Ds2 of the stator have the following relationships:

$$Dr1 \geq Do, Di < Dr2 < Do$$

$$Ds2 \leq Di, Di < Ds1 < Dr1.$$

Accordingly, the motor can be produced by fitting the rotor onto the stator after assembling the rotor and the stator separately. Thus, the motor with excellent assembling workability can be realized.

In order to increase the torque of the motor, large magnetic flux flowing between the fixed yoke and the rotational yokes is required. As a result, a large magnetic force acts between the fixed yoke and the rotational yokes. At this time, if the fixed yoke and the rotational yokes come into contact with each other, a large frictional force is generated at the contact point. In order to prevent the above-described problem, the stepping motor according to this embodiment includes the first bobbin 3 and the second bobbin 5 functioning as bearing units so as to keep small gaps between the fixed yoke and the rotational yokes. This leads to smooth rotation of the rotor. The first bobbin 3 and the second bobbin 5 correspond to intermediate members according to the sixth aspect of the present invention.

However, since the gaps between the fixed yoke and the rotational yokes can cause an increase in magnetic resistance, the gaps are as small as possible. According to this embodiment, the flux-transmitting portions extend in the axial direction so as to increase the areas where the fixed yoke and the rotational yokes face each other. Thus, the magnetic flux can easily flow between the fixed yoke and the rotational yokes. In addition, magnetic fluid filled in the gaps between the fixed yoke and the rotational yokes can effectively improve slidability and reduce magnetic resistance.

According to this embodiment, the bobbins fixed to the stator are used as intermediate members. However, intermediate members may be fixed to the rotor (for example, the connecting member 9) and used as bearing units. Alternatively, the rotational yokes may be directly supported by the fixed yoke so as to be rotatable. The fixed yoke and the rotational yokes that are in contact with each other can reduce the magnetic resistance.

In this case, application of a lubricant (for example, lubricating oil or magnetic fluid), lubricant coating (for example, fluorine-based lubricant coating, graphite-based lubricant coating, or molybdenum-disulfide-based lubricant coating), lubricant plating (for example, electroless nickel plating containing particles of polytetrafluoroethylene or Teflon(R) electroless nickel plating), or the like to the sliding surfaces of the fixed yoke and the rotational yokes can regulate a torque loss by the friction at the sliding surfaces, can prevent a loss in durability of the sliding surfaces, and can increase the output torque. Alternatively, the rotor may be supported by bearing members composed of a magnetic material so as to be rotatable with respect to the stator. This leads to an improvement in slidability of the rotor, and prevents an increase in magnetic resistance.

The rotor is disposed at the outermost layer in this embodiment. Therefore, unlike the known technology, output pins are not necessary, and output can easily be extracted. In addition, when a component driven by the motor is a non-magnetic cylinder such as a plastic molded lens barrel, the component can be used as the connecting member. Thus, a motor having less thickness in the radial direction (having a small diameter) compared with the known technology can be realized.

The distance from the outer end of one bearing unit to the outer end of the other bearing unit that support the rotor can be equal to the length of the motor in the axial direction. This structure has advantages compared with the known efficiency described in Japanese Patent Laid-Open No. 2002-51526 where the distance between the bearing units is substantially equal to the thickness of the magnet. Therefore, the rotation axis of the rotor is not easily inclined with respect to the stator, resulting in rotation with a smaller loss.

Since the magnet 1 is fixed to the fixed yoke adjacent to the rotor so as not to rotate, the magnet 1 does not easily undergo vibration or shock. In addition, since the inner side of the magnet 1 is fixed, the mechanical strength is increased. As a result, a magnet thinner than those of the known technology can be used.

Since the magnet and the coils are fixed to the stator, the coils and the magnet can be brought into close contact with each other in the axial direction. As a result, the gap between the magnet and the first coil and the gap between the magnet and the second coil can be omitted so as to reduce the length in the axial direction. Thus, the magnetic flux can be effectively used.

Since the stators according to the known technology have U-shaped cross sections, the inner magnetic poles and the outer magnetic poles must be integrated. Such stators can be produced by, for example, metal injection molding, which leads to cost overruns. On the other hand, the stepping motor according to this embodiment is formed of simple members such as the cylindrical fixed yoke and the substantially cylindrical rotational yokes. Accordingly, the components can be produced by roll-bending plate materials at lower costs.

Second Embodiment

Figure 7:
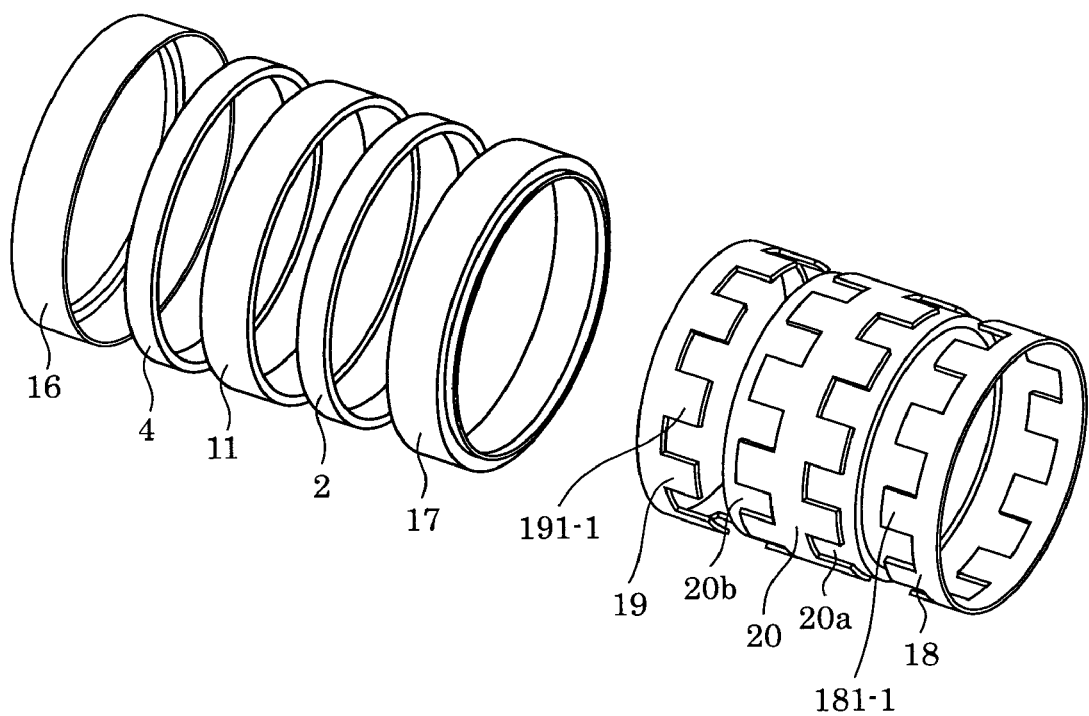
FIG. 7 is an exploded perspective view illustrating component parts of a stepping motor according to a second embodiment of the present invention.
Figure 8:
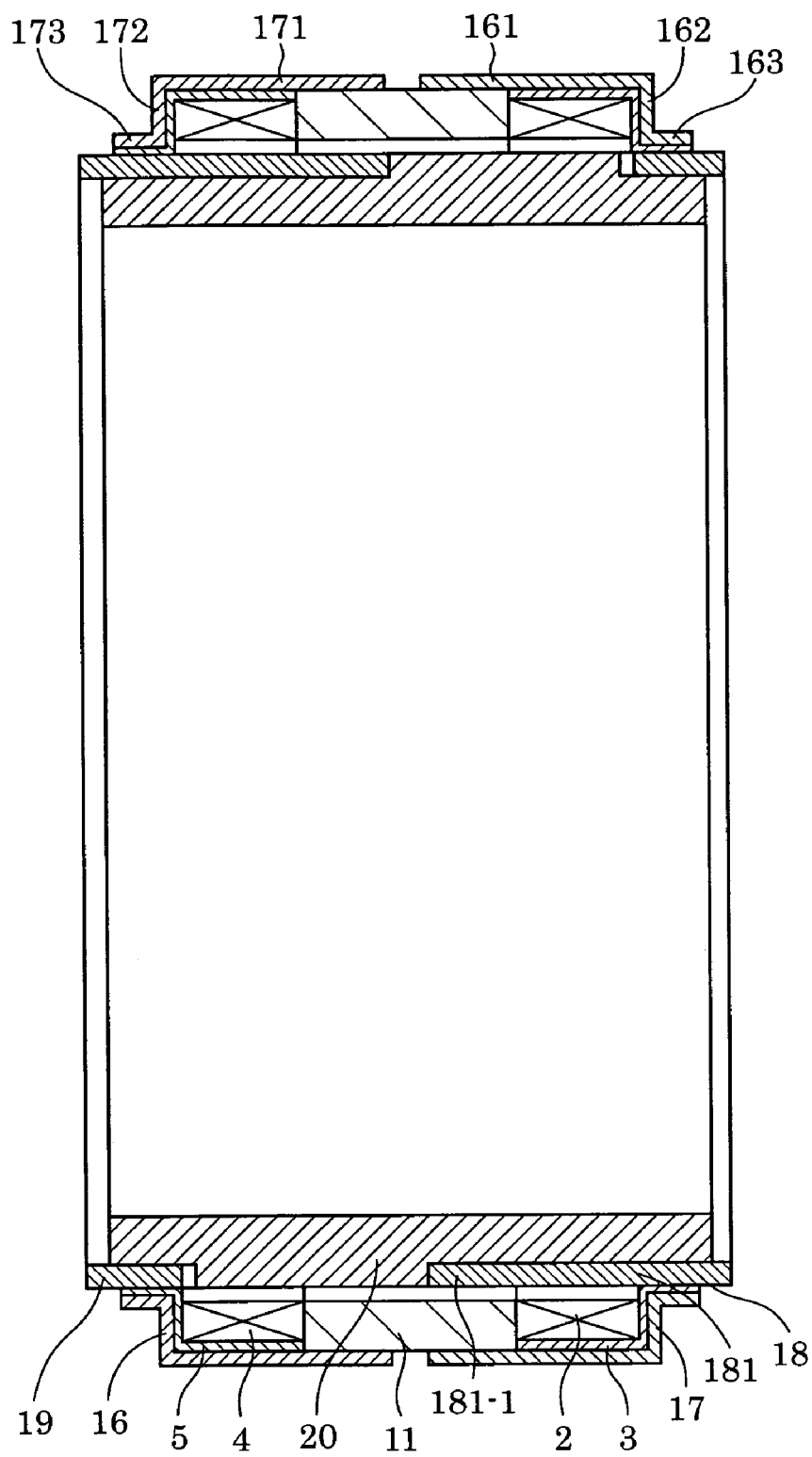
FIG. 8 is a cross-sectional view illustrating the structure of the stepping motor shown in FIG. 7 after assembly.
Figure 9:
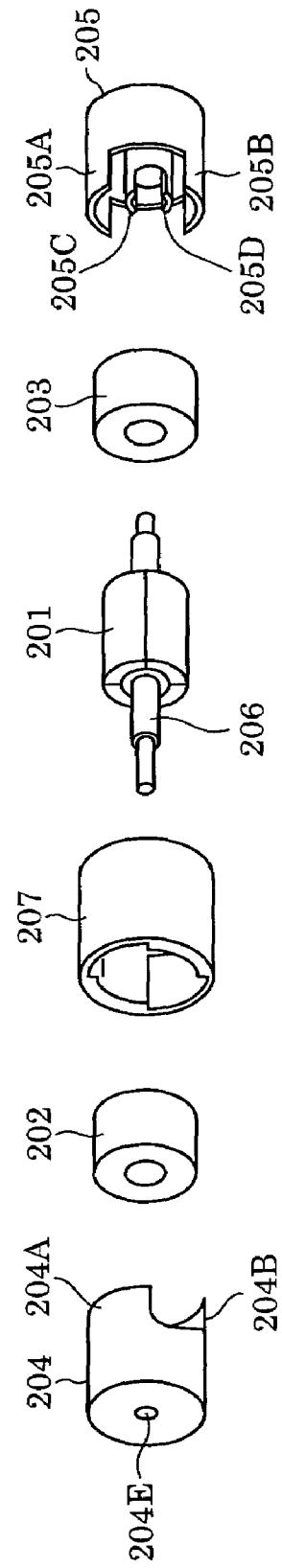
FIG. 9 is an exploded perspective view illustrating component parts of a known stepping motor.
Figure 10:
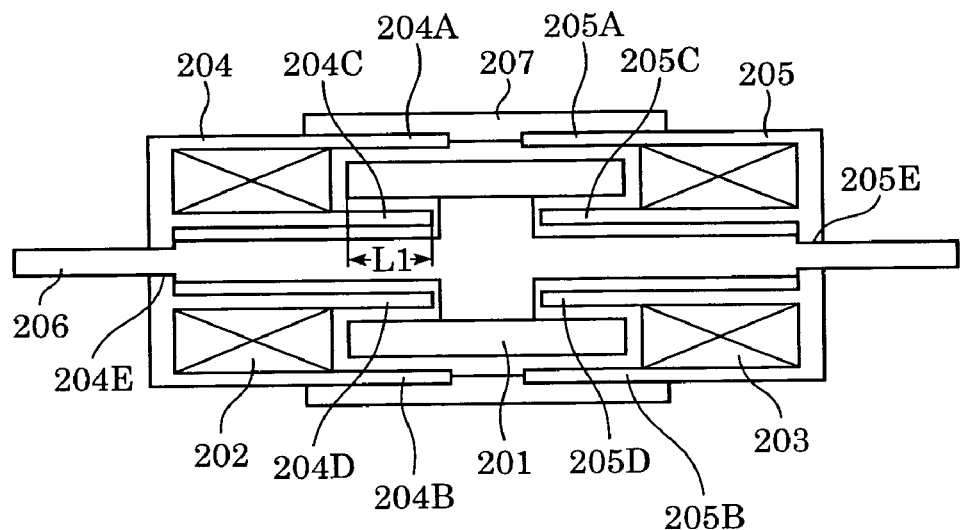
FIG. 10 is a cross-sectional view illustrating the structure of the stepping motor shown in FIG. 9 after assembly.
Figure 11:
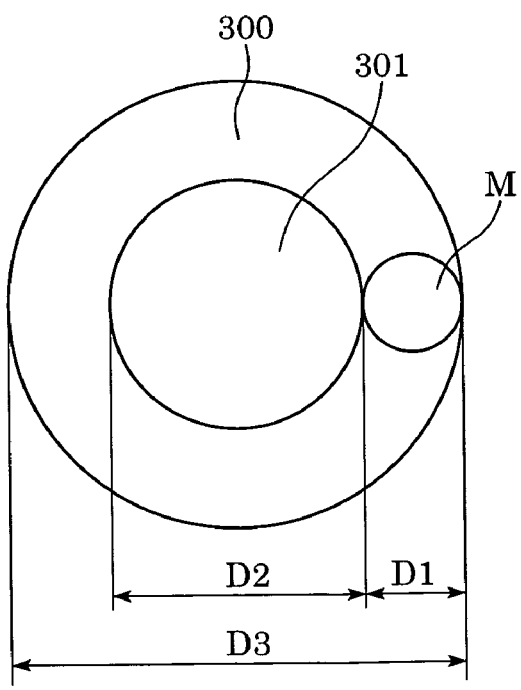
FIG. 11 illustrates the layout of a light-amount adjusting device, an aperture, and a motor shown in the axial direction.
Figure 12:
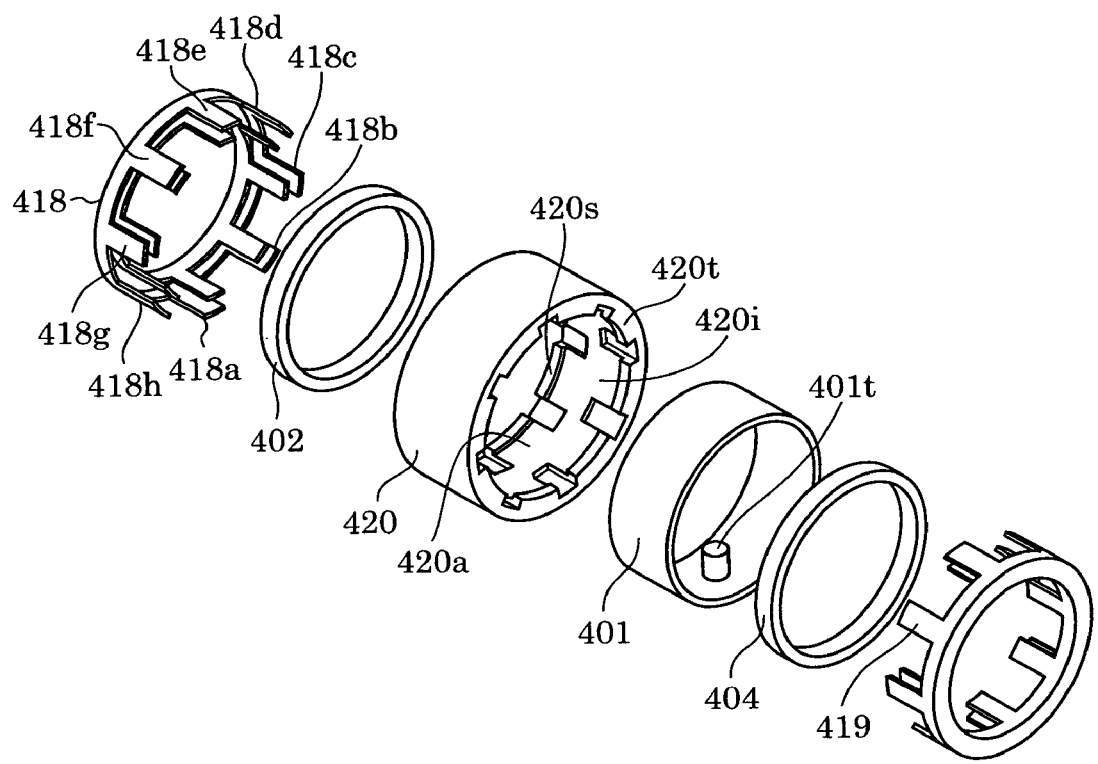
FIG. 12 is an exploded perspective view illustrating component parts of another known stepping motor.
Figure 13:
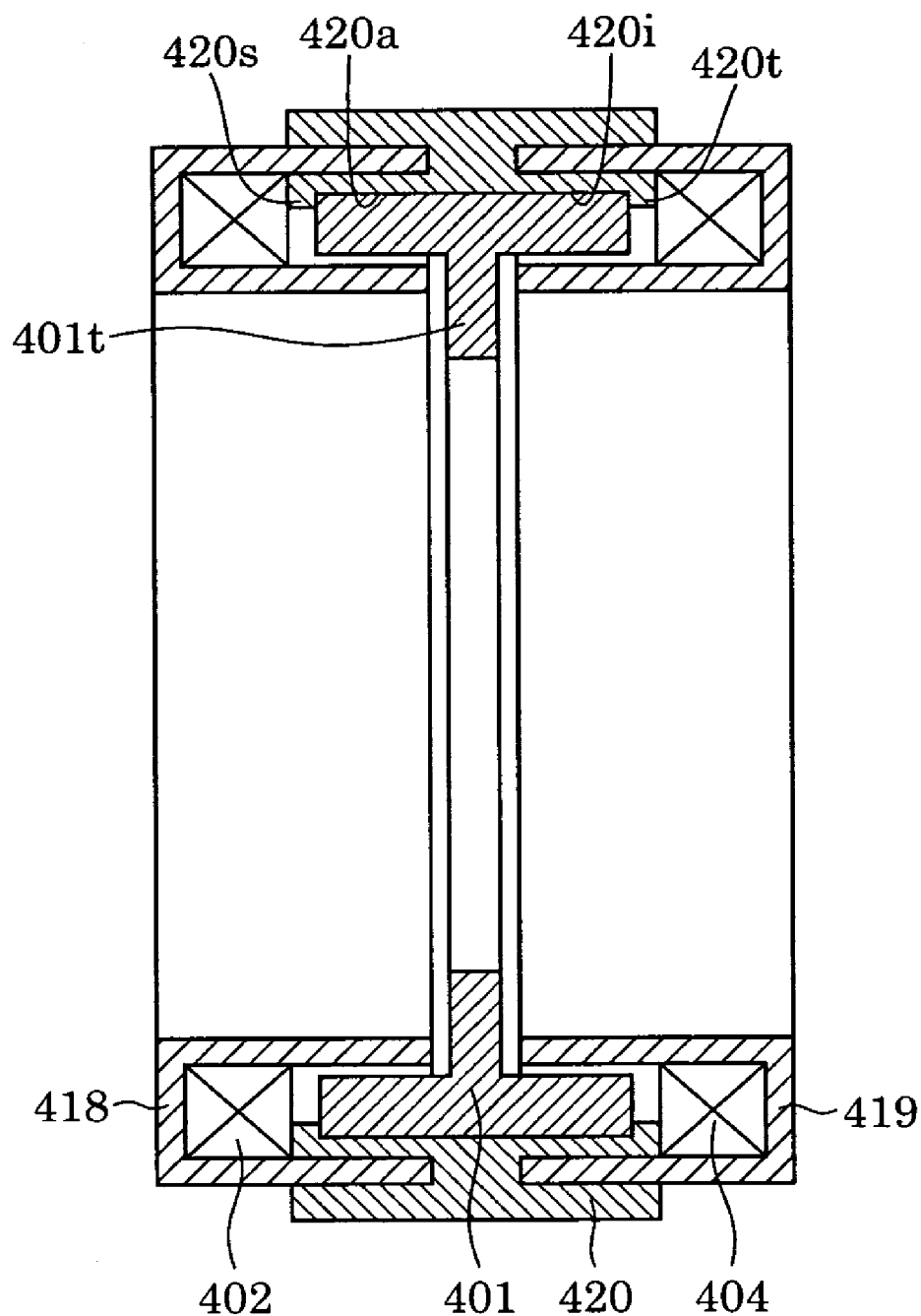
FIG. 13 is a cross-sectional view illustrating the structure of the stepping motor shown in FIG. 12 after assembly.

In the stepping motor according to the first embodiment, the rotor is disposed at the outermost layer. In a stepping motor according to a second embodiment, a rotor is disposed at the innermost layer. FIG. 7 is an exploded perspective view illustrating component parts of the stepping motor according to the second embodiment. FIG. 8 is a cross-sectional view illustrating the structure of the stepping motor after assembly. The cross-sectional view in FIG. 8 is taken at the center of the axis. The same reference numerals are used for the same components as in the stepping motor according to the first embodiment. The stepping motor according to the second embodiment includes a magnet 11, a first coil 2, a second coil 4, a first fixed yoke 17, a second fixed yoke 16, a first rotational yoke 18, a second rotational yoke 19, and a connecting member 20.

The magnet 11 is a hollow cylinder. The surface of the inner periphery of the magnet 11 is divided into N sections in the circumferential direction, and the sections are alternately magnetized in S-pole or N-pole. In this embodiment, N equals 20. The external surface of the magnet 11 may have a magnetized distribution weaker than that of the internal surface, may not be magnetized, or may be magnetized in opposite poles with respect to the internal surface. As the diameter of the magnet is reduced, the magnetization of the internal surface becomes more difficult. In this case, a magnet with strong magnetic force can be produced by curling a magnetized sheet so as to form a ring, by joining arc-shaped magnetized sheets, or the like.

The first fixed yoke 17 is composed of a soft magnetic material, and includes a magnetic pole 161, a top 162, and a flux-transmitting portion 163 integrated with each other. The magnetic pole 161 is a hollow cylinder, and the internal diameter substantially equals the external diameter of the magnet 11. The flux-transmitting portion 163 is also a hollow cylinder, and the internal diameter substantially equals the external diameter of the first rotational yoke 18. In addition, the second fixed yoke 16 is composed of a soft magnetic material, and has the same shape as the first fixed yoke 17. A stator according to this embodiment is configured with the first and second coils and the first and second fixed yokes having the magnet 11 therebetween and coaxially fixed to each other.

The first rotational yoke 18 composed of a soft magnetic material includes an internal cylinder 181. The internal cylinder 181 of the first rotational yoke 18 includes first magnetic poles 181-1, 181-2 . . . 181-N/2 at one end thereof. These first magnetic poles 181-1, 181-2 . . . 181-N/2 are formed by cutting out parts of the cylinder so as to form a so-called comb shape whose teeth extend along the central axis of the magnet 11 and parallel to the magnetized surface of the magnet 11. The number of teeth of the first magnetic poles is 1 to N/2. In this embodiment, the number is ten, and the first magnetic poles having a predetermined width are disposed at intervals of 720°/N in the circumferential direction. Also, the second rotational yoke 19 is composed of a soft magnetic material, and has the same shape as the first rotational yoke 18.

The connecting member 20 is a hollow cylinder composed of a non-magnetic material. The external diameter of the connecting member 20 substantially equals those of the first and second rotational yokes. Moreover, the connecting member 20 includes positioning portions 20a for the first rotational yoke and positioning portions 20b for the second rotational yoke on the outer periphery thereof. The positioning portions 20a for the first rotational yoke are grooves that have substantially the same width of the first magnetic pole 181-1 of the first rotational yoke 18. The number of the positioning portions 20a is the same as that of the first magnetic poles. The positioning portions 20b for the second rotational yoke are grooves that have substantially the same width of the second magnetic pole 191-1 of the second rotational yoke 19. The number of the positioning portions 20b is the same as that of the second magnetic poles.

The first rotational yoke 18 and the second rotational yoke 19 are coaxially disposed at predetermined positions and with predetermined phases by fitting the first rotational yoke 18 and the second rotational yoke 19 into the positioning portions 20a for first rotational yoke and the positioning portions 20b for the second rotational yoke of the connecting member 20, respectively. The rotor of the stepping motor according to this embodiment is configured with the first rotational yoke 18, the connecting member 20, and the second rotational yoke 19 disposed as above. Since the connecting member 20 is composed of a non-magnetic material, the magnetic circuit between the first rotational yoke 18 and the second rotational yoke 19 is separated, and the magnetic poles do not easily influence on each other.

According to the second embodiment, the rotor is disposed at the innermost layer. Therefore, the motor can be used for a device having a fixed outer part and a rotational inner part, for example, a cam cylinder of a lens barrel. In this case, the cam cylinder composed of a non-magnetic material serving as the connecting member can realize a barrel having less thickness in the radial direction (having a small diameter).

In general, rotational yokes are thinner than magnets in the radial direction. In addition, the specific gravity of soft magnetic materials such as electromagnetic stainless steels and electromagnetic soft iron used for the rotational yokes is substantially the same as that of rare-earth magnets such as neodymium-iron-boron and samarium-cobalt used for the magnets. Therefore, as in this embodiment, the rotational yokes serving as the rotor can realize a motor having small rotor inertia.

Moreover, as in this embodiment, two components serving as the fixed yokes can prevent the interference between the magnetic circuit generated by the first coil and that generated by the second coil. Furthermore, the shapes of the first and second fixed yokes, and the shapes of the first and second rotational yokes can be the same, respectively, so as to reduce costs. That is to say, although the number of parts is increased by one as compared with the first embodiment, the variety of parts can be reduced by one.

While the present invention has been described with reference to exemplary embodiments, it is to be understood that the invention is not limited to the disclosed exemplary embodiments. The scope of the following claims is to be accorded the broadcast interpretation so as to encompass all modifications, equivalent structures and functions.

For example, in the above-described embodiment, the fixed yokes are configured as a stator and the rotational yokes are configured as a rotor. However, the fixed yokes may be used as a rotor and the rotational yokes may be used as a stator depending on application purposes.

This application claims the benefit of Japanese Application No. 2004-254454 filed Sep. 1, 2004, which is hereby incorporated by reference herein in its entirety.

What is claimed is:

1. A motor comprising:
   a hollow cylindrical stator;
   a magnet disposed coaxially with the stator and divided into sections in a circumferential direction, the sections being alternately magnetized;
   a first coil and a second coil coaxially fixed to the stator;
   a rotor including first and second magnetic pole members,
   wherein the first magnetic pole member faces a magnetized surface of the magnet and is excited by the first coil,
   wherein the second magnetic pole member faces the magnetized surface of the magnet and is excited by the second coil, and
   wherein the rotor is rotatable with respect to the stator.

2. The motor according to claim 1, further comprising a bearing unit supporting the rotor such that the rotor is rotatable with respect to the stator.

3. The motor according to claim 2, further comprising an intermediate member composed of a non-magnetic material, wherein the bearing unit is disposed in the intermediate member and supports the rotor so as to be rotatable with respect to the stator.

4. The motor according to claim 1, wherein the magnet is magnetized on an external surface thereof and is fixed outside the stator, and wherein the first coil and the second coil are fixed outside the stator.

5. The motor according to claim 4,
   wherein the stator and the rotor are individually sectioned into two in the axial direction, and
   wherein an external diameter (Do) of the magnet, an internal diameter (Di) of the magnet, a maximum internal diameter (Dr1) of the rotor, a minimum internal diameter (Dr2) of the rotor, a maximum external diameter (Ds1) of the stator, and a minimum external diameter (Ds2) of the stator have the following relationships:

$Dr1 \geq Do$, $Di < Dr2 < Do$, $Ds2 \leq Di$, and $Di < Ds1 < Dr1$.

6. The motor according to claim 1, wherein the magnet is magnetized on an internal surface thereof and is fixed inside the stator, and wherein the first coil and the second coil are fixed inside the stator.

7. The motor according to claim 6, wherein the stator comprises a first stator member excited by the first coil and a second stator member excited by the second coil.

* * * * *